United States Patent
Lehnhardt et al.

(10) Patent No.: US 9,141,822 B2
(45) Date of Patent: Sep. 22, 2015

(54) COMPUTER SYSTEM FOR STORING AND RETRIEVAL OF ENCRYPTED DATA ITEMS, CLIENT COMPUTER, COMPUTER PROGRAM PRODUCT AND COMPUTER-IMPLEMENTED METHOD

(71) Applicant: Compugroup Medical AG, Koblenz (DE)

(72) Inventors: Jan Lehnhardt, Koblenz (DE); Adrian Spalka, Koblenz (DE)

(73) Assignee: COMPUGROUP MEDICAL AG, Koblenz (DE)

( * ) Notice: Subject to any disclaimer, the term of this patent is extended or adjusted under 35 U.S.C. 154(b) by 0 days.

(21) Appl. No.: 14/080,040

(22) Filed: Nov. 14, 2013

(65) Prior Publication Data

US 2014/0237230 A1 Aug. 21, 2014

(30) Foreign Application Priority Data

Nov. 8, 2012 (EP) ..................................... 12191795

(51) Int. Cl.
*H04L 29/06* (2006.01)
*G06F 21/62* (2013.01)
(Continued)

(52) U.S. Cl.
CPC ...... *G06F 21/6218* (2013.01); *G06F 17/30864* (2013.01); *G06F 21/34* (2013.01);
(Continued)

(58) Field of Classification Search
CPC ........ H04L 9/3247; G06F 17/30; G06F 21/34
USPC .................. 713/165, 185; 726/2, 4, 6, 7, 8
See application file for complete search history.

(56) References Cited

U.S. PATENT DOCUMENTS 6,073,129 A 6/2000 Levine et al.
8,266,435 B2 9/2012 Spalka et al.
(Continued)

FOREIGN PATENT DOCUMENTS

WO 9938080 A1 7/1999
WO 0042491 A1 7/2000

OTHER PUBLICATIONS

D. Song, D. Wagner and A. Perrig, "Practical Techniques for Searches on Encrypted Data", in Proc. of the 2000 IEEE Symposium on Security and Privacy (S&P 2000), 2000.*
(Continued)

*Primary Examiner* — Dant Shaifer Harriman
*Assistant Examiner* — Abiy Getachew

(57) ABSTRACT

A system is disclosed comprising multiple sets of client computers each client computer having installed thereon an application program The application program comprising client computer specific log-in information, a database system coupled to the set of client computers via a network. The database system having a log-in component for logging-in the client computers, and being partitioned into multiple relational databases each one of which is assigned to one set of the sets of client computers. Each database further storing encrypted data items, each data item being encrypted with one of the user or user-group specific cryptographic keys, the key identifier of the cryptographic key with which one of the data items is encrypted being stored in the database as an attribute of the one of the encrypted data items. The log-in component comprising assignment information indicative of the assignment of the databases to the set of client computers.

22 Claims, 4 Drawing Sheets

(51) Int. Cl.
*G06F 21/34* (2013.01)
*H04L 9/32* (2006.01)
*G06F 17/30* (2006.01)

(52) U.S. Cl.
CPC ........ *G06F21/6227* (2013.01); *G06F 21/6245* (2013.01); *H04L 9/3247* (2013.01); *H04L 63/0435* (2013.01); *H04L 63/0442* (2013.01); *H04L 63/0471* (2013.01); *G06F 2221/2107* (2013.01)

(56) References Cited

U.S. PATENT DOCUMENTS

| | | |
|---|---|---|
| 2003/0021417 A1* | 1/2003 | Vasic et al. .............. 380/277 |
| 2003/0135731 A1 | 7/2003 | Barkan et al. |
| 2003/0217264 A1 | 11/2003 | Martin et al. |
| 2004/0194141 A1 | 9/2004 | Sanders |
| 2004/0215661 A1 | 10/2004 | Zhang et al. |
| 2005/0128947 A1 | 6/2005 | Silverman |
| 2005/0177521 A1 | 8/2005 | Crosson Smith |
| 2007/0118731 A1 | 5/2007 | Zizzi |
| 2008/0016357 A1 | 1/2008 | Suarez |
| 2008/0046984 A1 | 2/2008 | Bohmer et al. |
| 2008/0080718 A1* | 4/2008 | Meijer et al. .............. 380/282 |
| 2008/0134286 A1 | 6/2008 | Amdur et al. |
| 2009/0012819 A1 | 1/2009 | Mahesh et al. |
| 2009/0046862 A1 | 2/2009 | Ito et al. |
| 2009/0249440 A1 | 10/2009 | Platt et al. |
| 2009/0300351 A1* | 12/2009 | Lei et al. .............. 713/165 |
| 2009/0313483 A1 | 12/2009 | Ranade |
| 2010/0082991 A1 | 4/2010 | Baldwin et al. |
| 2010/0266132 A1 | 10/2010 | Bablani et al. |
| 2010/0319056 A1 | 12/2010 | Gillum et al. |
| 2011/0047385 A1 | 2/2011 | Kleinberg |
| 2011/0129089 A1 | 6/2011 | Kim et al. |
| 2011/0131420 A1 | 6/2011 | Ali et al. |
| 2011/0145593 A1* | 6/2011 | Auradkar et al. .............. 713/189 |
| 2012/0291114 A1 | 11/2012 | Poliashenko et al. |
| 2013/0212385 A1 | 8/2013 | Schechter et al. |
| 2014/0028726 A1 | 1/2014 | Dave et al. |
| 2014/0136840 A1 | 5/2014 | Spalka et al. |
| 2014/0237231 A1 | 8/2014 | Spalka et al. |

OTHER PUBLICATIONS

C Wang, K Ren, W Lou, J Li—Network, IEEE, 2010—ieeexplore.ieee.org.*

Al-Sakran, H.O. et al., "Efficient Cryptographic Technique for Securing and Accessing Outsourced Data," (IJCSIS) International Journal of Computer Science and Information Security,vol. 9, No. 8, Aug. 2011, 6 pages.

Song, D. et al.,"Practical Techniques for Searches on Encrypted Data", in Proc. of the 2000 IEEE Symposium on Security and Privacy (S&P 2000), 2000; 12 pages.

Non-Final Office Action mailed Mar. 26, 2015 for U.S. Appl. No. 14/080,126, 45 pages.

Non-Final Office Action mailed Apr. 10, 2015 for U.S. Appl. No. 14/080,110, 40 pages.

Final Office Action mailed Aug. 13, 2015 for U.S. Appl. No. 14/080,110, 45 pages.

Final Office Action mailed Aug. 12, 2015 for U.S. Appl. No. 14/080,126, 49 pages.

* cited by examiner

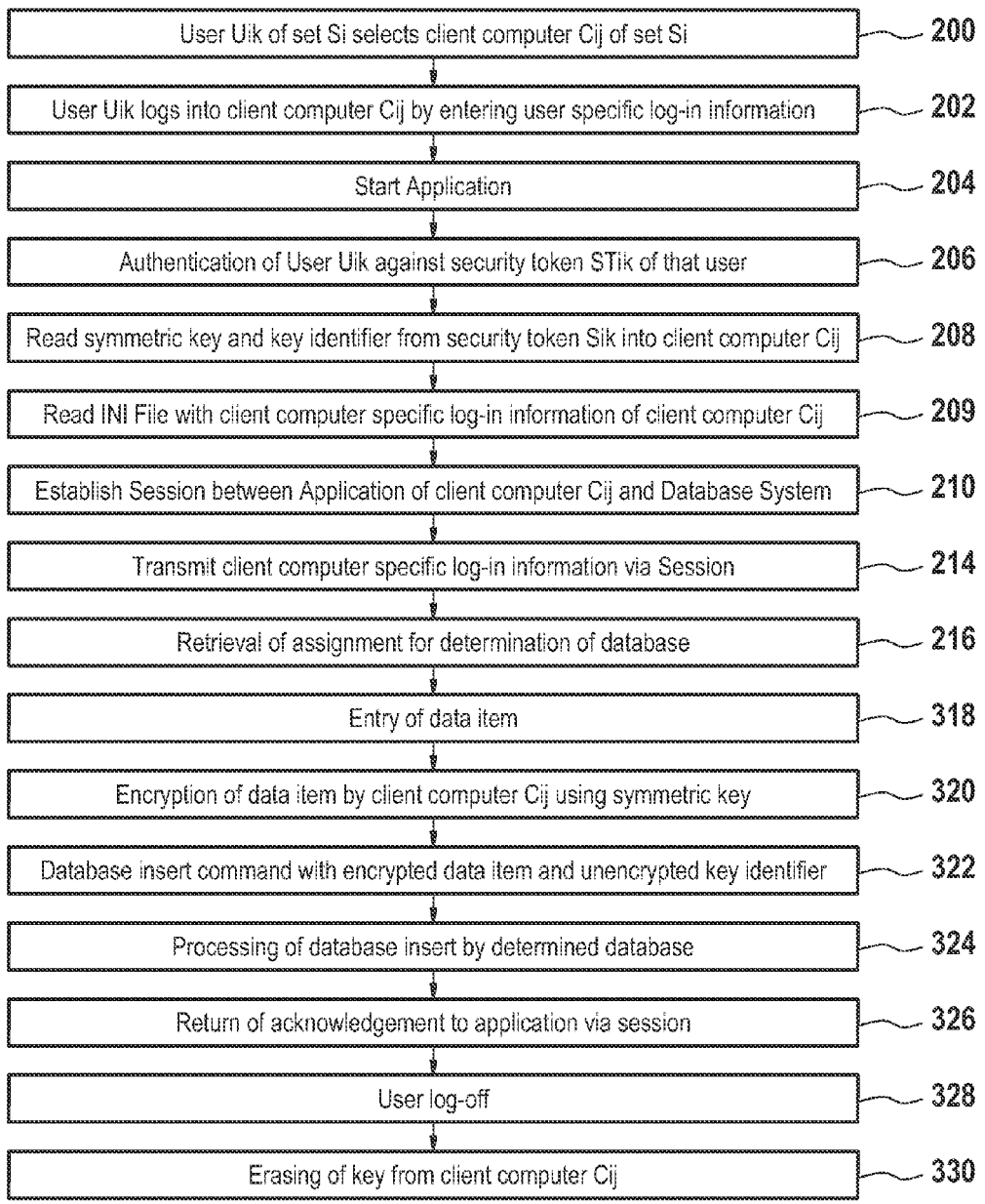

COMPUTER SYSTEM FOR STORING AND RETRIEVAL OF ENCRYPTED DATA ITEMS, CLIENT COMPUTER, COMPUTER PROGRAM PRODUCT AND COMPUTER-IMPLEMENTED METHOD

CROSS-REFERENCE TO RELATED APPLICATION(S)

The present application claims priority to European Patent Application No. EP 12 191 795.9, entitled "COMPUTER SYSTEM FOR STORING AND RETRIEVAL OF ENCRYPTED DATA ITEMS, CLIENT COMPUTER, COMPUTER PROGRAM PRODUCT AND COMPUTER-IMPLEMENTED METHOD," filed on Nov. 8, 2012, the entirety of which is herein incorporated by reference.

The present application is related to U.S. patent application Ser. No. 14/080,310 entitled "COMPUTER SYSTEM FOR STORING AND RETRIEVAL OF ENCRYPTED DATA ITEMS, CLIENT COMPUTER, COMPUTER PROGRAM PRODUCT AND COMPUTER-IMPLEMENTED METHOD," filed on Nov. 14, 2013, and U.S. patent application Ser. No. 14/080,126, entitled "COMPUTER SYSTEM FOR STORING AND RETRIEVAL OF ENCRYPTED DATA ITEMS USING A TABLET COMPUTER AND A COMPUTER-IMPLEMENTED METHOD," filed on Nov. 14, 2013.

The present invention relates to a computer system for storing and retrieval of encrypted data items, such as for storing encrypted data items in the cloud, as well as a respective client computer, client computer system, computer program product and computer-implemented method.

Storage and retrieval of encrypted data items for which confidentiality needs to be preserved on a server computer is as such known from the prior art, such as from D. Song, D. Wagner and A. Perrig, "Practical Techniques for Searches on Encrypted Data", in Proc. of the 2000 IEEE Symposium on Security and Privacy (S&P 2000), 2000 and (IJCSIS) International Journal of Computer Science and Information Security, Vol. 9, No. 8, August 2011, Efficient Cryptographic Technique for Securing and Accessing Outsourced Data, Hasan Omar Al-Sakran, Fahad Bin, Muhayalrina Serguievskaia, Management Information Systems Department King Saud University Riyadh, Saudi Arabia.

It is an object of the present invention to provide an improved computer system for storing and retrieval of encrypted data items as well as a respective client computer, computer program product and computer-implemented method.

The underlying problem of the invention is solved by the features laid down in the independent claims. Embodiments of the invention are given in the dependent claims.

Embodiments of the invention provide for a computer system that has multiple sets of client computers. Each set of client computers may belong to a separate organizational entity, such as a separate health service provider, and be located in a separate access restricted environment, such as a medical practice or hospital. Access restriction to the environment can be implemented by physical, such as edificial, and/or organizational measures and/or by an electronic access control system. For example, the entrance door of a medical practice has an electronic lock that can be unlocked by presenting a security token of an authorized user that belongs to the medical practice, such as one of the health professionals or an assistant. During the opening hours of the medical practice access control can be performed by the receptionist of the medical practice.

It is important to note that the access restricted environment in which a set of client computers is located is a trusted environment in which confidentiality of data items, such as patients' medical records, is preserved.

In accordance with embodiments of the invention some or all of the client computers are located outside an access protected enclosed trusted environment. For example, at least some of the client computers are portable electronic telecommunication devices, such as mobile radios or digital cellular mobile telephones, such as smartphones or tablet computers that have a telecommunication interface, such as a GSM, UMTS, WLAN or other network interface.

This is particularly beneficial for applications that involve terrestrial users in vehicles or on foot, such as for emergency responder organizations or public works organizations. In the field of the provision of healthcare services this is particularly beneficial as it enables the use of a mobile portable battery powered client device in the context of emergency medical services and/or home visits of patients by medical doctors.

A data item as understood herein is any data value of a data element of a tuple that comprises one or more data elements, such as a data value of a data field of a data record that has multiple data fields, within a database, such as a relational database, object oriented databases, object relational databases, hierarchical databases, noSQL databases, or in-memory database. For example, a medical data record of a patient may comprise various data elements, e.g. data fields, such as name, address, telephone number and medical data fields of that patient where data values for name, address and telephone number are exemplary data items.

The cryptographic key and key identifier that is stored in one of the security tokens is specific to the authorized user such that a data item that is inserted into the database upon a respective entry of the data item by that user is encrypted with that user's cryptographic key and can only be retrieved and decrypted by the same user as the user needs to present the security token for the retrieval and decryption operation. Alternatively the user has to memorize the cryptographic key and its key identifier for entry into the respective client computer. As a further alternative the user has to memorize a credential, such as a username/password combination, for entry into the client computer. When the client computer receives the credential from the user it derives the cryptographic key assigned to the user and the respective key identifier using a predefined deterministic algorithm. For example, a predefined function can be utilized for deriving a symmetric key from the user credential. For deriving an asymmetric key pair a method disclosed in U.S. Pat. No. 8,266,435 B2 which is incorporated herein in its entirety can be utilized whereby the credential from which the asymmetric key pair is derived comprises a unique user ID and an arbitrarily selectable user ID.

A "cryptographic key" as understood herein encompasses a symmetric key that serves both for encryption and decryption as well as an asymmetric cryptographic key pair, where the public key is used for encryption and the private key is used for decryption.

A "key identifier" as understood herein encompasses an identifier of a symmetric key or an identifier that identifies an asymmetric cryptographic key pair.

Alternatively the cryptographic keys and key identifiers stored on the security tokens are not user but user-group specific. For example all authorized users of the same set of client computers, i.e. users belonging to the same organizational entity, share a common cryptographic key and key identifier that is specific to that user-group. As a further alternative user-groups within a given organizational entity that share the same set of client computers can be defined for database access rights management such that the users of such defined groups within the organizational entity share a common cryptographic key and key identifier.

In accordance with an embodiment of the invention the cryptographic key and its key identifier of a given user enables the user to access further cryptographic keys and their respective key identifiers. This is accomplished by storing such additional cryptographic keys in encrypted form on the database system together with the respective key identifiers.

Upon entry of the user's cryptographic key and key identifier into the client computer the key identifier is sent from the client computer to the database system. In response to receipt of the key identifier the database system returns the set of encrypted cryptographic keys that are assigned to the received key identifier such that the client computer can decrypt that additional set of cryptographic keys using the key that the user has entered. When a query is performed one or more of the additional key identifiers can be used as alternative or additional search criteria in order to include data items into the search that can be decrypted by one of the cryptographic keys that are available on the client computer.

In accordance with embodiments of the invention the application program is operational for generating an electronic signature for the encrypted data item and/or the key identifier. The database system is operational for checking the validity of the electronic signature and for executing the database insert command only if the electronic signature is valid. This provides an additional level of security against sabotage.

In accordance with alternative embodiment of the invention the application program is operational for generating an electronic signature for the unencrypted data item and/or the key identifier. The database system is not operational for checking the validity of the electronic signature, as it has no access to the unencrypted data item, and executes the database insert command without checking the validity of the electronic signature. The checking of the validity of the electronic signature is performed by the application program after retrieval and decryption of the data item. This also provides an additional level of security against sabotage.

In accordance with embodiments of the invention each set of client computers belongs to or constitutes a trusted entity and each set of client computers has its own dedicated set of users that are authorized with respect to that set of client computers. It is important to note that each entity as such is trusted and maintains the confidentiality of its own data items but that such trust does not exist between the various entities such that each one of the entities is prevented access to data items of another one of the entities.

In accordance with embodiments of the invention the database system is coupled to all sets of client computers via a network, such as a public network, in particular the Internet. The database system has a log-in component for logging-in the client computers.

A log-in component' of the database system is understood herein as encompassing any component of the database system for receiving authentication information, such as a username and password combination, and for establishing a database connection upon successful authentication. For example, upon receipt of a log-in command by the database system, the database system requests entry of the authentication information and establishes the database connection if the authentication information is correct.

It is important to note that the authentication information, i.e. the log-in information, is not user-specific in accordance with the present invention but it is client computer specific as the log-in information forms an integral part of the application program that is installed on any one of the client computers.

Providing the application programs with client computer specific log-in information rather than log-in information that is specific to the trusted environment has the advantage that removal or loss of one of the client computers from the trusted environment does not require to replace the log-in information in all of the remaining client computers within that trusted environment. Further, another advantage is that the assignment information used by the log-in component of the database system does only need to be updated by deleting the log-in information of the removed or lost client computer without a need to change the assignment information otherwise.

After a session via the network has been established between the application program and the database system, such as an internet session, the application program sends a log-in command to the database system in response to which the database system prompts the application program for sending the log-in information. In response, the application program reads the log-in information and sends the log-in information to the database system for checking and for establishing the database connection with one of the databases. It is important to note that such a log-in operation can be executed without the user's interaction as the user does not need to enter log-in information as the log-in information is client computer specific and forms an integral part of the application program. Hence a standard log-in function provided by the database system, such as a MySQL log-in function, is used not for logging in a user but for logging in the client computer on which the application program that comprises the log-in information is installed.

In accordance with embodiments of the invention the database system is partitioned into multiple databases where each one of the databases is assigned to one set of the sets of client computers. In other words, the database system comprises multiple databases and there is a one-to-one relationship between sets of client computers and databases. This serves as a protection of a database that is assigned to one of the sets of client computers from attacks, such as denial of service attacks, from one of the other sets of client computers and it limits the risk against sabotage, the infiltration of computer viruses and other malicious software to the individual databases while limiting the risk of spreading from one database to another.

The assignment of sets of client computers to databases is implemented by assignment information that is indicative of these assignments and which is accessible by the log-in component. The log-in component uses the authentication information, i.e. the log-in information, that it receives from a client computer for retrieval of the assignment of that client computer and thus the set to which it belongs to one of the databases. A database connection is then established between the application program of that client computer and the assigned database provided the log-in is successfully completed.

Each one of the databases stores encrypted data items whereby the encryption is performed with one of the user or user-group specific cryptographic keys of the security tokens. Each one of the encrypted data items is stored in conjunction with the key identifier, but not the key itself, that was used for encryption of the data item as an attribute. This facilitates to limit the search in the database for retrieval of an encrypted data item to such data items that have been encrypted by a given cryptographic key.

In accordance with embodiments of the invention a database query is generated by encrypting a search criterion with the entered key by the application program. The search can thus be executed by the respective database in the encrypted domain. In addition to the search criterion that is entered by the user the query is limited by the key identifier of the entered key, such that the database system only returns encrypted data items that not only match the encrypted search criterion but also the key identifier. This way the set of database hits that are returned in response to the query is limited to encrypted data items that have been encrypted with the key that is identified by the key identifier. This reduces the network load and avoids unnecessary data processing operations by the client computer, such as for attempting to decrypt and/or verify a encrypted data item that can in fact not be decrypted by the client computer.

In accordance with embodiments of the invention the client computers also have log-in components for providing an additional level of security. The client log-in components serve for logging in a user by means of user specific authorization information, such as a username/password combination and/or biometric user information. After user log-in into one of the client computers the user may start the application program that is installed on that client computer whereupon the user is prompted to present his or her security token.

The application program may then send an access command, such as a chip card command in the form of an APDU, to the security token for reading the cryptographic key and the key identifier stored on that security token of the user. the user must first authenticate against the security token in order to enable such a read access by the application program. This way it is ensured that the security token that is presented by the user is in fact the security token of that user.

After performance of the client computer specific log-in into the database system and the establishment of the database connection the user may perform multiple queries or insert data items while the cryptographic key and key identifier are stored in the working memory of the client computer. The cryptographic key and key identifier are automatically erased from the memory of the client computer and no copy is retained by the client computer when one of the following events occurs a time-out condition is fulfilled, e.g. a predefined time period of user inaction with respect to the application program has occurred, the database connection and/or the network session is interrupted, the application program is closed by the user or automatically by logging out the user, the power supply of the client computer is interrupted.

This can be implemented e.g. by the log-in component of the client computer or by the application program. This has the advantage that the user needs to present his or her security token only once after each log-in for ease of use of the system while a high level of security is maintained due to the fact that the cryptographic key that has been read in from the security token is automatically erased when the user is logged out.

In accordance with embodiments of the invention each client computer has a client log-in component for logging-in a user into the respective client computer upon receiving authentication information from that user, such as a username/password combination and/or biometric information, wherein the cryptographic key and the key identifier is entered into the client computer after logging-in that user and stored in the client computer until the user is logged-out. For example, the user is prompted to enter his or her cryptographic key and key identifier by the application program that is started after the user has logging-in into the client computer.

In accordance with embodiments of the application the client computer specific log-in information of a client computer is stored in a configuration file of the application program that is installed on that client computer, such as an INI file, a registry or an XML.config file of the application program.

In accordance with embodiments of the invention each security token has a secure memory area in which a private key of an asymmetric cryptographic key pair assigned to that security token and its user is stored. Further, the security token has a processor for generating an electronic signature using that private key. Such an electronic signature is also referred to as a digital signature. For insertion of a data item into the respective database a signature of that data item is generated by the security token and stored in the database together with the encrypted data item. When the encrypted data item is retrieved at a later point of time by the same user or a user that belongs to the same user-group the validity of that signature can be checked by the application program after decryption of the data item.

Embodiments of the invention are particularly advantageous as they enable the efficient and secure storage of confidential data, such as medical records, in the cloud. The term 'cloud' as understood herein encompasses any database system that is accessible via a network, such as the Internet, and that is outside the control and responsibility of the organizational entities, such as health service providers, that utilize that database system. Embodiments of the invention are particularly advantageous as the storage of confidential data, such as medical records, in the cloud, i.e. a third party storage system or network, is enabled while fulfilling all regulatory requirements as to the maintenance of confidentiality. In particular, the third party that operates the database system does not need to be a trusted entity in terms of maintenance of confidentiality, authenticity and integrity of the data.

In another aspect the present invention relates to a client computer for use in a computer system in accordance with embodiments of the invention and to a client computer system that comprises the combination of such a client computer and a security token of one of the users.

In accordance with another aspect the present invention relates to a client computer system as claimed.

In accordance with still another aspect of the invention a computer-implemented method and a computer program product as claimed.

In accordance with embodiments of the invention the cryptographic key or the cryptographic keys that are stored on a client computer for encryption and/or decryption of data items are automatically erased from the memory of that client computer if the user closes the application program running on that client computer, the user is logged off by the operating system of the client computer, such as when a timeout condition is fulfilled due to an extended phase of user inaction, and/or when the power supply is switched off or becomes unavailable, such as when the client computer is switched off or the storage capacity of the battery that powers the client computer is exhausted. Preferably, the at least one cryptographic key for the encryption and/or decryption of the data items is stored in volatile memory of the client computer such that it is ensured that the at least one key is erased when the power supply is switched off or becomes unavailable, such as when the client computer is a mobile battery powered device and its batteries become exhausted.

Automatically erasing the at least one key from the memory of the client computer is particularly beneficial if the client computer is utilized outside the trusted environment, such as for terrestrial use in vehicles or on foot. In such a situation it may occur that a user leaves his or her client computer unattended. Automatically erasing the at least one key from the client computer such as when a timeout condition is fulfilled provides an additional level of security. Even if an unauthorized party gets into the possession of the client computer which has been lost by an authorized user or that was stolen the unauthorized party can not access or decrypt the encrypted data items that are stored on the database system if the key has been erased from the memory of that client computer before the unauthorized party gets into the possession.

In accordance with further embodiments of the invention the at least one key is erased from the memory of the client device in response to a respective command received from the user in order to enable another authorized user to utilize that client device while preventing access of to the data items of the previous user. This has the additional advantage of making a user log-in of the operating system, such as a Windows log-in, superfluous or unnecessary, as entering the cryptographic key that is assigned to one of the users for encryption and/or decryption of data items de facto also serves as a log-in credential for utilizing a given one of the client computers.

Embodiments of the invention are particularly advantageous as confidentiality, authenticity and integrity of the data items that are stored by the database system are maintained even though the database system may be under the control of an untrusted third party. In addition, embodiments of the invention also provide protection against inter-customer vandalism by partitioning the database system into separate databases which are assigned to individual customers, i.e. organizational entities, such as health service providers.

Furthermore, embodiments of the present invention provide protection against unintentional erroneous data storage operations as well as against intentional sabotage, such as erasing data from one of the databases. This is accomplished by a database log that tracks database changes such that an earlier status of a database can be reconstructed from the database log.

BRIEF DESCRIPTION OF THE DRAWINGS

In the following embodiments of the invention are described in greater detail by way of example only making reference to the drawings in which:

FIG. 4 is a flow chart being illustrative of an embodiment of the invention for storing an encrypted data item in the database system.

DETAILED DESCRIPTION

Figure 1:
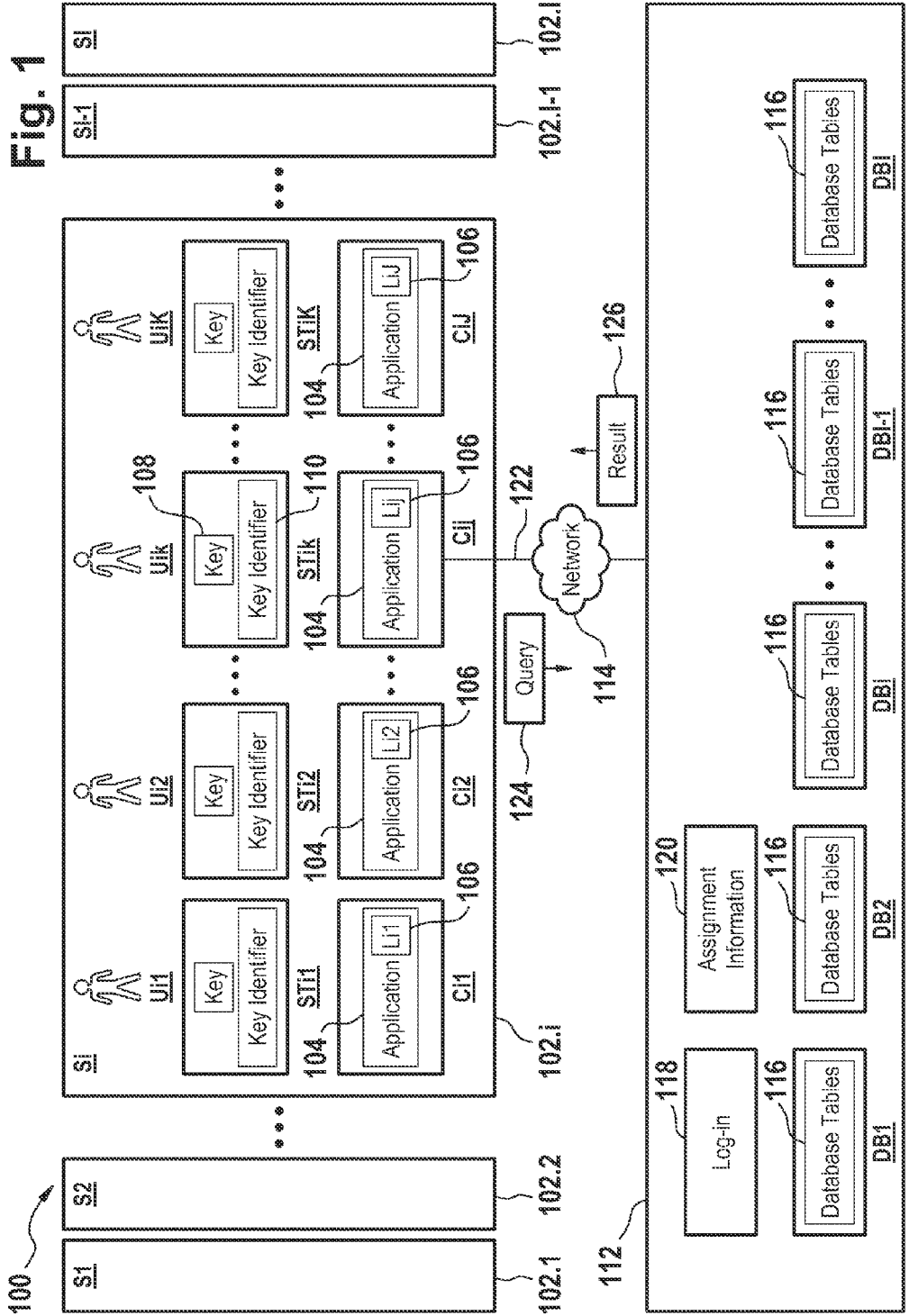
FIG. 1 is a block diagram of an embodiment of a computer system of the invention.

Throughout the following description of various embodiments of the invention identical reference numerals are used for designating like or identical elements.

FIG. 1 shows a computer system 100 that comprises multiple sets of client computers, i.e. a number I of sets S1, S2, ... Si, ... SI-1, SI. Each one of the sets Si is located in a respective trusted environment 102 that is in some way access restricted. For example, the set S1 of client computers is located within trusted environment 102.1, set S2 of client computers in trusted environment 102.2, ... set Si of client computers in trusted environment 102.i etc. such that there is a one-to-one relationship between sets Si of client computers and trusted environments 102.i. Alternatively at least one, some or all of the client computers are located outside a trusted environment, such as in a vehicle.

One of the trusted environments 102.i may be a medical practice or another enclosed area in a building, with restricted access. For example access into one of the trusted environments 102.i can be restricted by means of an electronic access control system and/or physical and/or organizational measures.

In the following the set Si of client computers is considered by way of example only and without restriction of generality: The set Si has a number of J client computers Ci1, Ci2, ... Cij, ... CiJ. On each one of the client computers Cij an application program 104 is installed that has a configuration file 106 storing client computer specific database log-in information Lij.

The database log-in information Lij of a given client computer Cij can be constituted by a 'username'/password combination or other authentication information. It is important to note that the 'username'/password combination or other authentication information is not assigned to an actual user but to the respective client computer Cij on which the application program 104 with the log-in information Lij is installed. Hence, 'username' does not refer to a user but to a specific client computer Cij.

The same applies analogously to the other sets of client computers where the number J of client computers per set can vary.

A group of a number K of authorized users Ui1, Ui2, Uik, ... UiK has access to the trusted environment 102.i, where the number of authorized users K can be below, equal or greater than the number of client computers J. Each client computer Cij of the set Si is set up such that any one of that group of authorized users which are authorized with respect to the trusted environment 102.i can utilize any one of these client computers of set Si.

Each one of the authorized users Uik has an assigned security token STik, such as a chip card. Each one of the security tokens STik has a memory for storing a cryptographic key 108 and a key identifier 110 of the cryptographic key 108.

The key 108 of security token STik may be specific to the user Uik to which the security token STik is assigned such that all authorized users across all trusted environments 102 have different cryptographic keys 108. Alternatively, the cryptographic keys 108 are user-group specific. For example, a user-group is constituted by all users Ui1 to UiK of the trusted environment 102.i such that all authorized users of that trusted environment 102.i share the same cryptographic key 108. Alternatively, one or more sub-groups of users of the group of authorized users of one of the trusted environments 102.i can be defined such that users of that subgroup share identical cryptographic keys 108.

The key identifier 110 can be a globally unique identifier (GUID) of the cryptographic key 108 such that any of the cryptographic keys 108 is unequivocally identified by its respective key identifier 110.

Each one of the sets of client computers is coupled to a database system 112 via a network 114, such as the internet. The database system comprises a number of I databases DB1, DB2, ..., DBi, ..., DBI-1, ..., DBI. Each one of the databases may be a relational database comprising database tables 116. Each one of the databases is assigned to one of the sets of client computers such that there is a one-to-one relationship between databases and sets of client computers. In other words, the set Si of client computers is assigned to the database DBi.

By way of example one of the database tables 116 of the database DBi is shown in a schematic way:

| Encrypted data item | key identifier |
|---|---|
| c | GUID (key) |
| ... | ... | where c is an encrypted data item, i.e. a cipher text that has been obtained by encryption of the data item using the cryptographic key 108 that is identified by the GUID stored as an attribute of c in the database table 116. The database table 116 may be split into separate relational database tables depending on the implementation.

It is important to note that the key 108 itself is not stored anywhere in the database system 112 and that the database tables 116 merely comprise cipher text, key identifiers and digital signatures, depending on the implementation. Hence, confidentiality of the data that is stored in the database tables 116 of the database system 112 does not need to be ensured as all data items are stored in encrypted form and the key identifiers and digital signatures are stored as attributes of the cipher text but not the keys themselves.

The database system 112 has a log-in component 118 that serves for logging in the various client computers of the sets of client computers. The log-in component 118 has access to assignment information 120 that is stored in the database system 112. The assignment information 120 may be stored in tabular form using the log-in information Lij of the configuration files 106 for specifying the assignments of the sets of client computers to the databases. For example, the assignment information 120 may be stored in the following tabular form:

| Client specific log-in information | database |
|---|---|
| Lij | i |
| ... | ... |

In other words, each log-in information Lij is assigned to one of the databases DBi that is identified by its index i in the tabular assignment information 120. The assignment information 120 may be split into separate relational database tables depending on the implementation.

Without restriction of generality and by way of example the user Uik is considered in the following:

The user Uik enters the trusted environment 102.*i*. If the trusted environment 102.*i* has an electronic access control system the user Uik may utilize its security token STik for obtaining access to the trusted environment 102.*i* through the electronic access control system, such as by inserting the security token STik or bringing the security token STik into the proximity of a chip card reader of the electronic access control system.

The user Uik may then select any one of the client computers of the set Si, such as client computer Cij. Depending on the implementation, the client computer Cij may have a log-in component for logging in the user Uik.

In response to a respective command entered by the user Uik into client computer Cij the application program 104 establishes a network session, such as an internet session 122 with the database system 112. The application program 104 reads the log-in information Lij from its configuration file 106 and sends the log-in information Lij via the internet session 122 to the database system 112 where it is received by the log-in component 118.

The log-in component 118 searches the assignment information for a matching log-in information. If such a matching log-in information can be identified the respective assignment of the matching log-in information Lij to one of the databases DBi is read from the assignment information 120 and a database connection is established between that database DBi and the application program 104 of the client computer Cij.

The application program 104 reads the key 108 and the key identifier 110 from the security token STik of the user Uik and stores this information temporarily. This may require unlocking the security token STik by authentication of the user Uik against the security token STik, such as by entry of a PIN.

The user Uik may then enter the search criterion into the application program 104 of the client computer Cij, such as an unencrypted data item for which matching records that are stored in the database system 112 are to be retrieved. Upon entry of the data item the application program 104 encrypts the data item using the key 108. The application program 104 then generates a database query 124 that contains the encrypted data item as a search criterion and the key identifier 110 of the cryptographic key 108 as an additional search criterion in order to limit the search to such encrypted data items that have a matching key identifier attribute.

This database query 124 is transmitted via the database connection established over the internet session 122 to the database DBi that has been identified by the log-in component 118 as the database that is assigned to the set Si. The database DBi executes a search for data records that have encrypted data items that match the encrypted data item and which in addition have a matching key identifier, i.e. a matching GUID, for processing of the query 124. This limits the search results to data items that have been encrypted by the key 108.

These search results 126 are returned from the database DBi to the application program 104 of the client computer Cij. The application program 104 decrypts the encrypted data items contained in result 126 by means of the key 108 and outputs the decrypted data items such as on a display of the client computer Cij.

For storing a data item in the database system 112 a database connection is established as described above. The user Uik enters a data item to be stored into the application program 104 which encrypts the data item using the key 108 and generates a database insert command for writing the encrypted data item with the key identifier 110 as an attribute to the database DBi.

Figure 2:
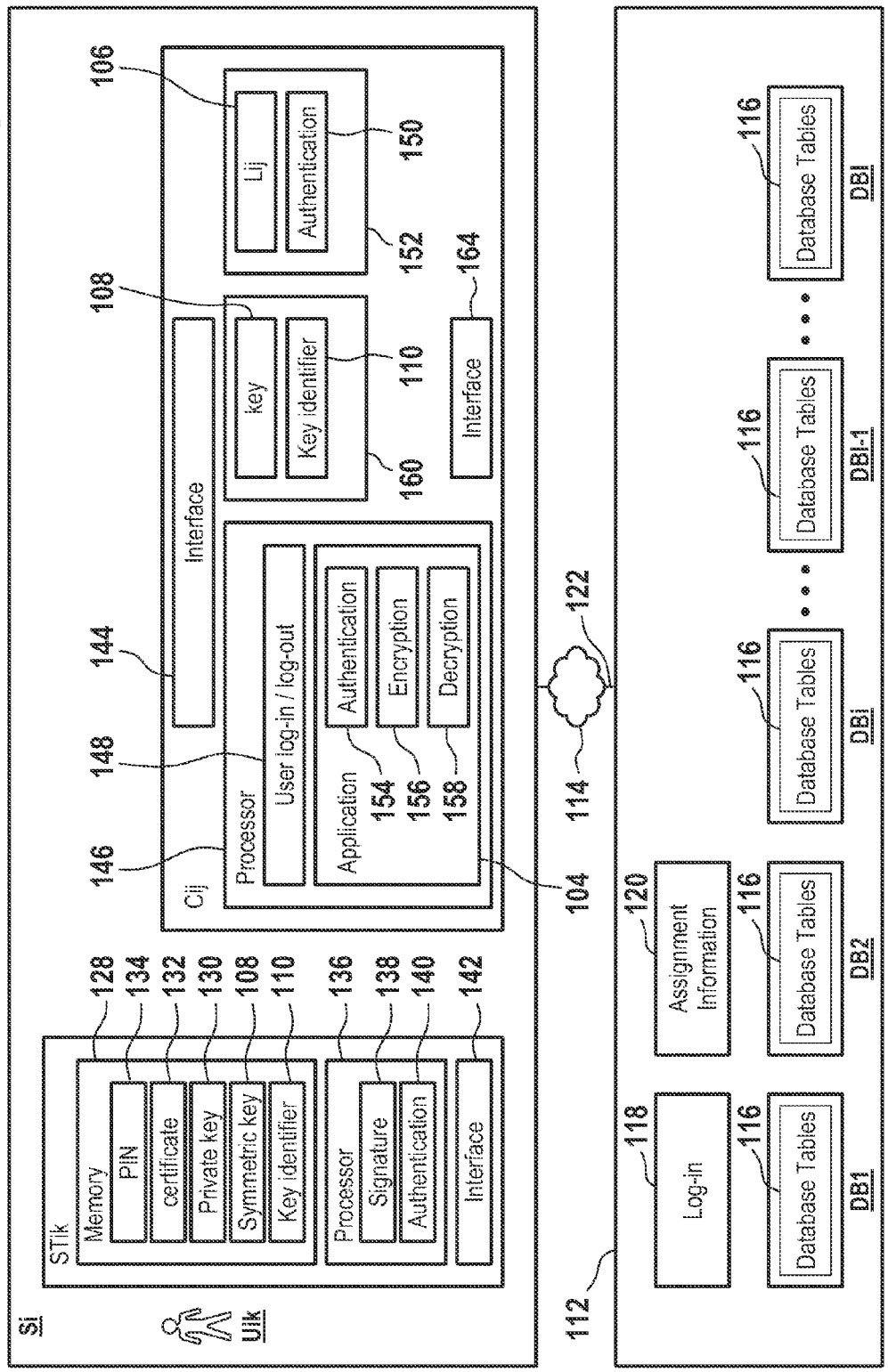
FIG. 2 is a more detailed block diagram being illustrative of an embodiment of a client computer system of the invention.

FIG. 2 shows a block diagram of a further embodiment of the invention. By way of example and without restriction of generality an arbitrary security token STik of a user Uik that has selected client computer Cij is shown in FIG. 2 whereby the other security tokens and client computers of the computer system 100 can be structurally identical or similar.

The security token STik has an electronic memory 128 for storing the cryptographic key 108 and the key identifier 110. Further, a private key 130 that belongs to an asymmetric cryptographic key pair assigned to the user Uik and the security token STik is stored in a secure storage area of the memory 128. A corresponding certificate 132 that contains the respective public key of the asymmetric cryptographic key pair may also be stored in the memory 128 or elsewhere.

The certificate 132 is a public key certificate that is also known as digital certificate that may be signed by a certificate authority within a public key infrastructure scheme. The certificate 132 may comply with any respective standard, such as X.509.

Further, authentication information 134 may be stored within a secure storage location of the memory 128, such as a personal identification number (PIN). Correct entry of the authentication information 134 into the security token STik may be required for unlocking the security token STik.

The security token STik has a processor 136 for execution of program modules 138 and 140. Further, the security token STik has a communication interface 142.

The program module 140 serves for authentication of the user Uik. For authentication the user Uik enters authentication information, such as a PIN, that the security token STik receives at its interface 142. By execution of the program module 140 the validity of the authentication information entered by the user Uik is checked by comparing it to the authentication information 134 that is stored in the memory 128. If the entered authentication information matches the authentication information 134 an authentication signal is generated by the program module 140 for unlocking the security token STik. This enables to read out the cryptographic key 108 and the key identifier 110 via the interface 142 and to request the generation of an electronic signature by execution of the program module 138 that uses the private key 130 for generating an electronic signature by the application program 104.

The client computer Cij has a communication interface 144 that is interoperable with the interface 142 of the security token STik. For example, the interfaces 142 and 144 are chip card interfaces or RF interfaces that comply with an RFID and/or NFC communication standard.

The client computer Cij has a processor 146 for execution of a program module 148 that may be part of the operating system and for execution of the application program 104 (cf. FIG. 1).

The program module 148 implements a log-in component that serves for logging in and logging out a user with respect to the client computer Cij. A user log-in may be performed by entering a username/password combination into the client computer Cij and matching that entered username/password combination with a respective authentication data 150 that contains the same username/password combination and which is stored in non-volatile memory 152 of the client computer Cij. Log-out may be performed automatically by the program module 148 when a timeout condition of extended user inaction is fulfilled.

The application program 104 comprises a program module 154 for authentication of the application program 104 and the client computer Cij on which it is installed vis-à-vis the database system 112. For that purpose the program module 154 is interoperable with the log-in component 118.

The application program 104 further comprises a program module 156 for encryption of a data item by means of the key 108 and a program module 158 for decryption of an encrypted data item using the key 108. The client computer Cij has a working volatile memory 160 for storing a copy of the cryptographic key 108 and its key identifier 110. A configuration file 106, such as a INI file, that contains the client computer specific log-in information required by the log-in component 118 is stored in the non-volatile memory 152.

Further, the client computer Cij has a network interface 164 for coupling the client computer Cij to the database system 112 via the network 114.

In operation the user logs into client computer Cij by entry of his or her username/password combination which is checked against the authentication data 150 stored in the memory 152 by the program module 148. If the entered username/password combination of the user Uik matches the authentication data 150 the user Uik is successfully logged into the client computer Cij. Execution of the application program 104 is started. This can be implemented by the standard Windows log-in if an Windows operating system is utilized on the client computer.

Next, the application program 104 prompts the user Uik to present his or her security token STik at the interface 144 such as by inserting the security token STik into a chip card reader of the client computer Cij. Next, the user Uik needs to authenticate vis-à-vis the security token STik for unlocking the security token. This is done by entry of the user's PIN into the security token STik either via the client computer Cij, via the chip card reader or directly into the security token STik depending on the implementation.

When the security token STik is unlocked the application program 104 generates a read command that is communicated via the interfaces 144 and 142 such as in the form of a command APDU for reading out the cryptographic key 108 and its key identifier 110. Copies of the key 108 and the key identifier 110 are then stored in the memory 160 by the application program 104.

Further, the application program 104 initiates the establishment of a database connection with the database system 112 by establishing the internet session 122, reading of the configuration file 106 that contains the client computer specific log-in information Lij by the program module 154 and sending the client computer specific log-in information Lij to the log-in component 118.

The log-in component 118 determines the database to which the set Si of client computers to which the client computer Cij belongs is assigned using the assignment information, i.e. by determining i from the tabular assignment information by means of the log-in information Lij contained in the configuration file 106 (cf. FIG. 1).

The database connection is then established between the application program 104 and the determined database, i.e. the database DBi, provided that the log-in information Lij is correct.

For retrieval of a data item or a data record that contains that data item the following steps are executed:

The user Uik enters the data item as a search criterion into the application program 104.

The application program 104 reads the key 108 from memory 160 and executes the program module 156 for encryption of the data item with the key 108 which provides the cipher text c.

The application program 104 reads the key identifier 110 from the memory 160.

The application program 104 generates a database query, such as an SQL query, containing the cipher text c and the key identifier 110 as search criteria and sends the database query via the database connection via the database connection that has been established over the internet session 122 to the database DBi.

The database DBi executes the database query by searching for matching data records that contain the cipher text c and the key identifier 110. The database DBi then returns matching data items via the database connection to the application program 104.

The application program 104 decrypts the returned data items by execution of the program module 158 using the cryptographic key 108 for decryption. If the data record contains a digital signature the validity of the digital signature is checked by the application program 104. The decrypted data records may then be displayed on a display of the client computer Cij. If the signature is invalid an error signal may be outputted.

For writing data to the database system 112 the following steps are performed after the database connection has been established:

The user Uik enters at least one data item or a complete data record that contains this data item in one of its data fields into the application program 104.

The application program 104 generates a command for generating a digital signature for the entered data item or data record which is sent via the interface 144 to the security token STik. For example, the application program 104 generates a hash value for the data item or the data record which is sent to the security token STik via the interface 144 for generating the signature by program module 138 using the private key 130.

The application program 104 reads the cryptographic key 108 from the memory 160.

The application program 104 encrypts the data item and other data contained in data fields of the data record, if any, by execution of the program module 156 using the cryptographic key 108.

The application program 104 reads the key identifier 110 from the memory 160.

The application program 104 generates a database insert command for writing the encrypted data item in conjunction with the key identifier 110 as an attribute and together with the digital signature to the database DBi.

The database insert command is transmitted from the application program 104 via the database connection and executed by the database DBi. The database DBi returns an acknowledgement to the application program 104 after completion of the database insert operation.

It is important to note that the database DBi does not check the validity of the signature that it receives with the database insert command. Checking of the signature only occurs after retrieval of the encrypted data item or data record from the database DBi in the client domain, e.g. by client computer Cij, in the embodiment considered here.

Figure 3:
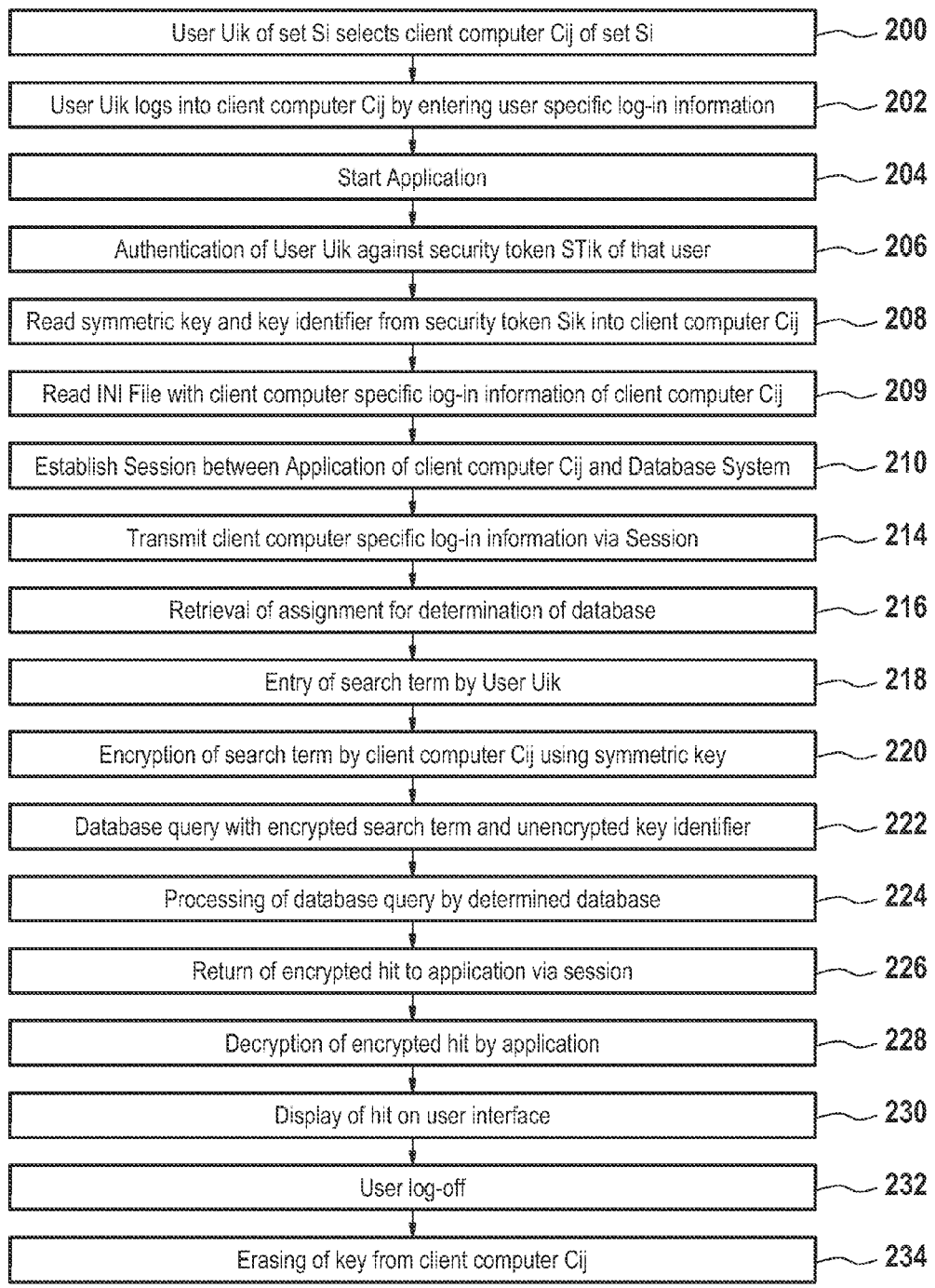
FIG. 3 is a flow diagram illustrating an embodiment of a method of the invention for retrieval of an encrypted data item.

FIG. 3 shows a flowchart of an embodiment of a method for retrieval of data from the database system 112.

In step 200 one of the users Uik that is an authorized user of the set Si of client computers that are within the trusted environment 102.i selects one of the client computers Cij of that set Si. In step 202 the user Uik logs into that client computer by entering user specific log-in information, such as his or her username/password or biometric information.

After successful log-in into client computer Cij the application program 104 is started in step 204. In step 206 the user Uik authenticates against his or her security token STik such as by entering his or her PIN. After successful authentication the security token STik is unlocked and the application program 104 can perform a read access onto the security token STik in step 208 for reading the cryptographic key 108 and its key identifier 110. The application program 104 stores copies of the cryptographic key 108 and the key identifier 110 in the working memory 160 of the client computer Cij.

The application program 104 reads the client computer specific log-in information Lij from its configuration file 106, such as its INI file (step 209). In step 210 the internet session 122 is established between the application program 104 and the database system 112 and transmits that log-in information Lij via the internet session 122 to the database system 112, namely its log-in component 118, in step 214.

The log-in component 118 uses the log-in information Lij for retrieval of the assignment of the client computer Cij from the assignment information 120 in step 216 in order to determine the database DBi to which the client computer Cij is assigned. The database connection is then established between that database DBi and the application program 104 over the internet session 122 if the database login operation has been successful.

For retrieval of a data item the user enters an unencrypted search term into the application program 104 in step 218. That search term is encrypted using the cryptographic key 108 in step 220 and a database query is generated in step 222 that contains the encrypted search term and in addition the unencrypted key identifier as an additional search criterion.

That database query is communicated to the database DBi via the database connection and processed by the database DBi in step 224. In response to the database query the database may return one or more encrypted hits to the application program 104, i.e. one or more data items that contain the encrypted search term, in step 226. In step 228 the returned search results are decrypted by the application program 104 using the cryptographic key 108 and the result of the decryption is displayed on a user interface in step 230. a digital signature that may also be returned by the database DBi is checked for validity. This may be a precondition for displaying the hit.

In step 232 a log-off condition is fulfilled, such that the user Uik is logged off from the client computer Cij. Such a user log-off may occur after an extended period of user inaction. As a consequence of the user log-off at least the key 108 is erased from the memory 160 of the client computer Cij in step 234.

FIG. 4 shows an embodiment of a method of the invention for writing data to the database system 112.

First, a database connection is established by execution of the steps 200-216 in the same or analogous way as described above with respect to the embodiment of FIG. 3.

Next, the user enters at least one data item in step 318 into the application program 104. The application program 104 encrypts the at least one data item in step 320 using the cryptographic key 108 and generates a database insert command in step 322. The database insert command comprises the at least one encrypted data item and the unencrypted key identifier 110 of the cryptographic key 108 with which the at least one data item has been encrypted; the database insert command can also comprise a digital signature.

The database insert command is communicated via the database connection to the database DBi which processes the database insert command in step 324. After the at least one encrypted data item has been written to the database table 116 of the database DBi together with the unencrypted key identifier and with a digital signature of the at least one data item, the database DBi returns an acknowledgement to the application program 104 in step 326.

Steps 328 and 330 are analogous to steps 232 and 234 of the FIG. 3 embodiment. In other words, when user log-off occurs at least the key 108 is automatically erased from the memory 160 without retaining a copy of that key 108 by the client computer Cij.

| List of Reference Numerals | |
|---|---|
| 100 | Computer system |
| 102 | Trusted environment |
| 104 | Application program |
| 106 | Configuration file |
| 108 | Cryptographic key |
| 110 | Key identifier |
| 112 | Database system |
| 114 | Network |
| 116 | Database table |
| 118 | Log-in component |
| 120 | Assignment information |
| 122 | Internet session |
| 124 | Query |
| 126 | Result |
| 128 | Memory |
| 130 | Private key |
| 132 | Certificate |
| 134 | Authentication information |
| 136 | Processor |
| 138 | Program module |
| 140 | Program module |
| 142 | Interface |
| 144 | Interface |
| 146 | Processor |
| 148 | Program module |
| 150 | Authentication data |
| 152 | Memory |
| 154 | Program module |
| 156 | Program module |
| 158 | Program module |
| 160 | Memory |
| 164 | Network interface |

The invention claimed is:

1. A computer system comprising:

multiple sets of client computers, each client computer having installed thereon an application program, the application program comprising client computer specific log-in information, a database system being coupled to the set of client computers via a network, the database system having a log-in component for logging-in the client computers, the database system being partitioned into multiple relational databases, each one of the databases being assigned to one set of the sets of client computers, each database storing encrypted data items, each data item being encrypted with a user or user-group specific cryptographic key, the key identifier of the cryptographic key with which one of the data items is encrypted being stored in the database as an attribute of the one of the encrypted data items, the log-in component comprising assignment information indicative of the assignment of the databases to the set of client computers, each one of the application programs being operational to perform the steps of:

a) establishing a network session with the database system over the network, b) transmitting the client computer specific log-in information to the database system via the session, c) receiving the key and the key identifier by the client computer for use of the key by the client computer and without transmitting the key to the database system;

d) entry of a search criterion into the client computer, e) generating a database query using the search criterion and the key identifier, the key identifier limiting the query to encrypted data items that have an attribute matching the key identifier, f) in response to the query, receiving at least one encrypted data item matching the search criterion from the database system, g) decrypting the encrypted data item using the cryptographic key, the database system being operational to perform the steps of:

i) receiving the client computer specific log-in information via the session by the log-in component of the database system, ii) determining one of the databases of the database system that is assigned to the client computer on which the application program is installed using the assignment information, by the log-in component of the database system, iii) entering the query received from the application program via the session into the database that has been determined using the log-in information for processing the query by that database.

2. The computer system of claim 1, wherein the query is generated by encrypting the search criterion with the entered key by the application program.

3. The computer system of claim 1, wherein the received key is erased from a memory of the client computer if any one of the following events occurs:

the application program which has received the key is closed;

the user is logged out from the client computer by a client log-in component after a timeout condition has been fulfilled;

the user session with the application program is timed out or closed by the user;

switching off a power supply of the client computer, exhausting the storage capacity of a battery that powers the client computer;

entry of a user command in response to which the key is erased.

4. The computer system of claim 1, a first sub-set of the client computers of at least some of the sets of client computers being located in a separate access restricted environment a second sub-set of the client computers being located outside the access restricted environment.

5. The computer system of claim 1, the application program comprising a configuration file, such as an INI file, a registry or an XML config file, that contains the client computer specific log-in information.

6. The computer system of claim 1, wherein the application program is operational to receive a user credential in step c, and to enter the user credential into a predefined deterministic algorithm for processing the user credential, wherein the processing of the user credential by the predefined algorithm provides the key and the key identifier.

7. The computer system of claim 1, each one of the application programs being operational for entry of a data item into the client computer, encrypting the data item with the key that has been received or derived by the client computer, generating a database insert command, the insert command comprising the encrypted data item and the key identifier of the key with which the data item has been encrypted as an attribute of the encrypted data item for storing the encrypted data item in the database system with the key identifier as an attribute, transmitting the insert command via the session to the database system for processing by the one of the databases that has been determined to be assigned to the client computer by the log-in component such that the encrypted data item with the key identifier is stored in that database.

8. The computer system of claim 1, further comprising a set of security tokens for each one of the sets of client computers, each security token being assigned to one authorized user of a group of users that are authorized for use of one of the sets of client computers, the user or user-group specific cryptographic key and the key identifier of that cryptographic key being stored on each one of the security tokens, wherein the key and the key identifier are received from one of the security tokens by the client computer in step c).

9. The computer system of claim 8, each security token having assigned an asymmetric cryptographic key pair comprising a private key and a public key, at least the private key being stored in the security token, each security token comprising a processor for generating an electronic signature using the private key, and each one of the application programs comprising being operational for
checking the validity of an electronic signature using the public key,
sending a command for generating an electronic signature for the data item that has been entered into the client computer to the one of the security tokens, and
receiving the electronic signature of that data item from the one of the security tokens,
wherein the insert command further comprises the electronic signature of the data item for storing the electronic signature together with the encrypted data item in the determined database, each one of the application programs being further operational to receive the electronic signature of the encrypted data item matching the search criterion from the database system, determining the public key that belongs to the asymmetric cryptographic key pair of the one of the security tokens and checking the validity of the data item using the public key.

10. The computer system of claim 1, the security token having a communication interface to the client computer for entry of the key and the key identifier.

11. The computer system of claim 10, the communication interface of the security token being adapted for receiving a command from the client computer for generating the electronic signature, for returning the electronic signature to the client computer and for entry of the cryptographic key and its identifier that are stored on the security token into the client computer.

12. The computer system of claim 1, a digital certificate for the asymmetric cryptographic key pair being stored on the security token.

13. The computer system of claim 1, the client computer being a personal computer, a portable computer, such as a laptop computer, a smartphone, a medical instrument or a portable digital appliance.

14. The computer system of claim 1, the security token being a chip card, in particular an electronic health card or a telecommunications chip card, such as a SIM or USIM card, a USB-token, or a radio-frequency tag.

15. The computer system of claim 1, the application program being operational to perform the following additional steps:
sending the key identifier that has been received in step c to the database system,
receiving a set of additional encrypted cryptographic keys together with respective key identifiers from the database system in response to sending the key identifier,
decrypting the set of cryptographic keys by means of the key that has been received in step c,
wherein the database query is generated in step e using one or more additional key identifiers that have been received from the database system.

16. The computer system of claim 1, the database system further comprising a database log for logging changes to the databases, the database log comprising one or more history tables for tracking the database changes, the database log being operational to undo any changes that have been tracked in response to a respective command from a database administrator.

17. The computer system of claim 7, the application program being operational for generating an electronic signature for the encrypted data item and/or the key identifier, the database system being operational for checking the validity of the electronic signature and for executing the database insert command only if the electronic signature is valid.

18. A computer implemented method being implemented by a computer system of claim 1, the method comprising the following steps:
a) establishing a network session with the database system over the network,
b) transmitting the client computer specific log-in information to the database system via the session,
c) entry of the key and the key identifier from one of the security tokens into the client computer for use of the key by the client computer and without transmitting the key to the database system;
d) entry of a search criterion into the client computer,
e) generating a database query using the search criterion and the key identifier, the key identifier limiting the query to encrypted data items that have an attribute matching the key identifier,
f) in response to the query, receiving an encrypted data item matching the search criterion from the database system,
g) decrypting the encrypted data item using the cryptographic key.

19. The method of claim 18 further comprising the following steps executed by the database system:
i) receiving the client computer specific log-in information via the session,
ii) determining one of the databases of the database system that is assigned to the client computer on which the application program is installed using the assignment information,
iii) entering the query received from the application program via the session into the database that has been determined using the log-in information for processing the query by that database.

20. A client computer for storing a data item in and reading the data item from a database system via a network, the client computer comprising:
an application program, the application program comprising client computer specific log-in information,
a communication interface for receiving a user or user-group specific key and a key identifier of that cryptographic key, the communication interface being operational for manual entry of user information specifying the user or user-group specific key and a key identifier and/or for communication with one security token of a set of security tokens, the security token being assigned to one authorized user, a user or user-group specific key and a key identifier of that cryptographic key being stored on the security token,
a network communication interface for communication with a database system,
the application program being operational to perform the following steps for writing the data item to the database system:
entry of the data item into the client computer,
encrypting the data item with the key that has been received by the client computer,
generating a database insert command, the insert command comprising the encrypted data item and the key identifier of the key with which the data item has been encrypted as an attribute of the encrypted data item for storing the encrypted data item in the database system with the key identifier as an attribute, establishing a session with the database system over the network by the network communication interface, transmitting the insert command via the session to the database system for processing by the one of the databases that has been determined to be assigned to the client computer by the log-in component such that the encrypted data item with the key identifier is stored in that database, the application program being operational to perform the following steps for reading the data item:

establishing a session with the database system over the network, transmitting the client computer specific log-in information to the database system via the session, entry of the key and the key identifier from one of the security tokens into the client computer for use of the key by the client computer and without transmitting the key to the database system;

entry of a search criterion into the client computer, generating a database query using the search criterion and the key identifier, the key identifier limiting the query to encrypted data items that have an attribute matching the key identifier, in response to the query, receiving an encrypted data item matching the search criterion from the database system, decrypting the encrypted data item using the cryptographic key.

21. A client computer system comprising a client computer in accordance with claim 20 and a security token, the security token having a communication interface for communication with the communication interface of the client computer.

22. A computer program product, in particular the non-transitory digital storage medium, comprising instructions that are executable by a client computer, the computer program product being an application program, the application program being operational to perform the following steps for writing the data item to the database system: entry of the data item into the client computer, encrypting the data item with the key that has been entered into the client computer, transmitting the insert command via the session to the database system for processing by the one of the databases that has been determined to be assigned to the client computer by the log-in component such that the encrypted data item with the key identifier is stored in that database, the application program being operational to perform the following steps for reading the data item: establishing a session with the database system over the network, transmitting the client computer specific log-in information to the database system via the session, entry of the key and the key identifier from one of the security tokens into the client computer for use of the key by the client computer and without transmitting the key to the database system; entry of a search criterion into the client computer, generating a database query using the search criterion and the key identifier, the key identifier limiting the query to encrypted data items that have an attribute matching the key identifier, in response to the query, receiving an encrypted data item matching the search criterion from the database system, decrypting the encrypted data item using the cryptographic key.

* * * * *